United States Patent Office 3,162,696
Patented Dec. 22, 1964

3,162,696
INTERPOLYMERIZED COMPOSITIONS COMPRISING ALKENYL AROMATIC MONOMERS AND ELASTOMERIC ETHYLENE COPOLYMERS
Robert L. Zimmerman and Giffin D. Jones, Midland, Mich., assignors to The Dow Chemical Company, Midland, Mich., a corporation of Delaware
No Drawing. Filed Sept. 8, 1958, Ser. No. 759,417
6 Claims. (Cl. 260—878)

The present invention contributes to the synthetic polymer art and relates more particularly to grafted interpolymer (or graft copolymer compositions) that are comprised of various alkenyl aromatic monomers, particularly styrene, and already-formed elastomeric and flexible, non-crosslinked ethylene copolymers as a copolymerized substituent. The invention has particular reference to the high elongation, high impact strength, exceptionally stable (particularly to light) products which may be obtained with such graft copolymer compositions. It is also concerned with the method of their preparation.

Graft copolymers and interpolymers, as conventionally understood, are the interpolymeric products which result when a monomeric substance is polymerized in the presence of and at least partially (if not entirely) upon a preformed polymeric material which serves as a "backbone" trunk or substrate for the graft copolymer product. Such products, particularly the actually graft copolymerized portions thereof, cannot be separated into all of their constituent parts by physical methods and may be further characterized as having a substantially heterogeneous molecular structure in which a non-statistical distribution of the interpolymerized materials is obtained due to the arrangement of chemically linked chains of different polymeric constituents.

It is the principal object of the present invention to provide new and improved graft copolymer compositions or graft copolymer-containing compositions having excellent tensile strength, good resistance to distortion under the influence of heat at elevated temperatures, high elongation, high impact strength and unusually good stability, particularly against the degradative and deleterious influence of light, said products being useful for the preparation of various shaped and fabricated articles in which the indicated properties and characteristics are of significant moment, great advantage and consummate benefit. A corollary objective of the present invention is to provide graft copolymer or graft copolymer-containing compositions characterized in being essentially free of unsaturation along the primary chains of the molecules in the polymer product so as to ensure the realization of and retention in the product of the desired indicated properties and characteristics, particularly as regards stability to light.

Such desiderata and other advantageous results and benefits may be realized according to the present invention which comprises a graft copolymer or graft copolymer-containing composition of (1) one, or, suitably, a mixture of more than one, (A) monoethylenically unsaturated alkenyl aromatic monomer, advantageously styrene or vinyl toluene, which monomer may (B) optionally be obtained and employed in a monomeric mixture with up to about an equimolar amount of an acrylic monomer such as acrylonitrile or acrylic or methacrylic acid, amide or ester, which monomer constituent or mixture of various monomeric constituents has been polymerized with (2) an elastomeric, non- or essentially non-crosslinked copolymer of ethylene selected from the group of ethylene copolymers consisting of (a) elastomeric copolymers of ethylene with another terminally unsaturated, non-aromatic hydrocarbon monoolefin containing from 3 to about 6 carbon atoms in its molecule (such as propylene, butylene, etc.), (b) elastomeric copolymers of ethylene with various vinyl esters, (c) elastomeric copolymers of ethylene with various vinyl ethers, (d) elastomeric copolymers, such as terpolymers, of ethylene with mixtures of the vinyl esters and vinyl ethers and (e) mixtures thereof.

Advantageously, the graft copolymer or graft copolymer-containing compositions of the present invention are prepared with and include between about 1 and 20 weight percent, more advantageously from about 2 to 10 weight percent, of the elastomeric ethylene copolymer substrate, base on the weight of the resulting graft copolymer composition. More advantageously, the graft copolymer products contain about 5 weight percent, based on the weight of the resulting composition, of the preformed ethylene copolymer substrate (2) that has been interpolymerized with (A) the alkenyl aromatic monomer or with a suitable mixture of alkenyl aromatic monomers or (B) with a suitable mixture of one or more alkenyl aromatic monomers with one or more of the acrylic monomers.

The interpolymers may be obtained by polymerizing the indicated monomeric constituents in the presence of the already-formed, elastomeric ethylene copolymer substrate. As might be expected, certain quantities of non-graft copolymerized polymeric products of the monomer constituents employed may be found and present in varying amounts in the compositions along with the actual graft copolymers that are made, depending upon the particular reaction conditions that are involved. Thus, when styrene is employed as the alkenyl aromatic monomer, homopolymeric styrene product is generally obtained in the graft copolymer compositions of the present invention. Likewise if a mixture of various alkenyl aromatic monomers are employed, there may be obtained, in addition to the graft copolymer constituent of the product, various homopolymers and copolymers of the alkenyl aromatic monomers utilized. Similarly, mixtures of homopolymers and copolymers are generally obtained along with the graft copolymer constituent when one or more alkenyl aromatic monomers are employed in the preparation of the present compositions in a mixture along with one or more acrylic monomers. In many cases, the actual content of graft copolymer constituent in the polymer products of the present invention constitutes a minor proportion of the resulting composition. In any event, the more or less completely graft copolymerized, preformed elastomeric ethylene copolymer substrate that is utilized is obtained in the resulting product in a condition of extremely effective and efficient dispersion therethrough. This possibilitates a most efficacious and beneficial "reinforcing," as it were, of the resulting graft copolymer composition or product with the ethylene copolymer substrate interpolymerized therein.

While the polymerization may be accomplished in various ways, it is advantageous to employ ordinary suspension or mass polymerization techniques with graft copolymerizable masses of the interpolymerizable constituents while using either heat at an elevated temperature as the sole polymerizing influence or by employing various catalysts to facilitate the desired polymerization. Thus, peroxide type catalysts (such as lauroyl peroxide, tert.-butyl hydroperoxide, di-tert.-butyl peroxide, dicumyl peroxide, etc.) may be employed with advantage to accomplish the polymerization, as may be high energy radiation generated in or obtained from electron accelerators and the like apparatus or radio-active materials (such as cobalt-60, cesium-137, nuclear reactor fission products, etc.) in the cases when thermal polymerization is not practiced. Conventional emulsifiers and other commonly employed operating conditions may also be used during the polymerization of the present compositions. Generally, regardless of the particular polymerizing conditions employed, it is advantageous to effect the interpolymerization by dissolving the already-formed elastomeric ethylene copolymer substrate in the monomer or mixture of monomers desired to be interpolymerizable therewith in the instances when such dissolution can be accomplished. This is of particular benefit in systems wherein alkenyl aromatic monomers are graft copolymerized with preformed elastomeric ethylene copolymers that are prepared with monomeric vinyl ethers containing more than a single vinyl group in the molecule (such as the divinyl ether of ethylene glycol).

The graft copolymer compositions of the present invention frequently have improved heat distortion characteristics, and/or better tensile strength, and/or significantly improved elongation, and/or much higher impact strength, and/or much better light stability (particularly against ultraviolet light) than many of the conventional homopolymers or copolymers of styrene or other alkenyl aromatic monomers. Generally, they are better in at least one of the indicated characteristics. Oftentimes they are superior in several or even all of the cited particulars to the heretofore known polymers of the mentioned type. The compositions of the present invention may be fabricated by extrusion with a minimized occurrence of interfering heterogeneity caused by local gelation. They may also be molded in generally conventional ways or otherwise shaped, as may be desired. As is apparent, they may be employed with great advantage to provide various high elongation and high impact strength compositions having unusual stability to light.

The compositions of the invention may be compounded and formulated in the usual manner with conventional and/or specialized stabilizers, fillers, pigments, extenders, dyestuffs, lubricants, plasticizers, etc. In this connection, although there is no general or absolute necessity to do so, it may be desirable in many instances to formulate the graft copolymer compositions for use by incorporating internal lubricants (such as mineral oil, butyl, stearate, etc.) and/or plasticizers therein in order to obtain optimum desired properties in the final product.

Advantageously, the elastomeric, substrate ethylene copolymer may be comprised of up to roughly an equal molar amount of the comonomer constitutent thereof, depending, in particular instances, upon the precise preformed copolymer that is utilized. Thus, in copolymers of ethylene with (a) other terminally unsaturated, non-aromatic hydrocarbon monoolefins, such as propylene, the copolymer may beneficially be comprised of an amount of the comonomeric higher olefin constitutent between about 15 and 75 weight percent, based on the weight of the resulting copolymer. More advantageously, copolymers of ethylene with higher non-aromatic, hydrocarbon olefins contain between about 30 and 65 weight percent of the copolymerized higher olefin comonomer. When ethylene copolymers of (b) vinyl esters or (c) vinyl ethers or (d) mixtures of vinyl esters and vinyl ethers are employed, it is advantageous for the weight percentage of the vinyl ester or vinyl ether comonomer, or both, in the resulting preformed ethylene copolymer substrate to be between about 2 and 40 percent, preferably from about 10 to 30 percent by weight. The preformed, substrate, elastomeric ethylene copolymers, being non-crosslinked, are, of course, soluble in various solvents (depending upon the particular copolymer involved). While they may often be soluble at ordinary temperatures, they generally are soluble hot in given organic solvent vehicles capable of dissolving them, including monomeric solvents adapted for the purpose and for use in the practice of the invention.

As indicated, it is advantageous to utilize copolymers of ethylene and propylene as the elastomeric substrate in the instances when it is desired to employ an already-formed ethylene copolymer (a) with a terminally unsaturated, higher non-aromatic hydrocarbon olefin. Suitable results, however, may also be obtained with elastomeric copolymers of ethylene and 1-butene, 1-pentene and 1-hexene. Surprisingly enough, satisfactory compositions are not generally available using polyethylene or polyisobutylene as the already-formed substrate due to the non-susceptibility of such materials to undergo chain transfer grafting. Likewise, satisfactory results are also generally unavailable if attempts are made to prepare the graft copolymer compositions with isotactic polypropylene, due to its non-elastomeric nature.

Typical of the vinyl esters (b) which may be employed in the non-crosslinked, elastomeric ethylene copolymer substrates contained in the graft copolymer compositions of the present invention are vinyl acetate, vinyl formate, vinyl benzoate, vinyl propionate and the like vinyl esters which may be generically represented by the formula:

wherein X may be hydrogen, alkyl groups containing from 1 to about 8 carbon atoms and aryl groups containing from 6 to about 8 carbon atoms (including the carbon atoms in ring-substituted alkyl substituents).

Typical of the vinyl ethers (c) which may be used with advantage in the preformed elastomeric ethylene copolymers are vinyl ethyl ether, vinyl-2-chloro-ethyl ethers, the divinyl ether of diethylene glycol, the monovinyl ether of diethylene glycol, divinyl ether, isobutyl vinyl ether, vinyl phenyl ether, the mono- and divinyl ethers of tetraethylene glycol, and the like which may be represented by the general structure:

$$CH_2=CHOZ \qquad (II)$$

wherein Z is selected from the group consisting of vinyl radicals, alkyl groups containing from 1 to about 8 carbon atoms, aryl groups containing from 6 to about 8 carbon atoms (including the carbon atoms in ring-substituted alkyl substituents), alkylene groups containing from 2 to about 8 carbon atoms, and mono- and divalent aliphatic radicals of from 2 to about 10 carbon atoms, which aliphatic radicals may be hydrocarbon or, advantageously, oxygen-containing (i.e., ether-containing) units. In this connection, an oxygen-containing aliphatic radical having up to six or so ether linkages may be employed. The divinyl ethers of glycols which fall within the scope of Formula II are, as is evident, comprised of ether-containing aliphatic radicals Z that are terminally, monoethylenically unsaturated so as to provide the second vinyl unit in the molecule.

Styrene or vinyl toluene may advantageously be utilized as the alkenyl aromatic monomer for interpolymerization with the flexible and elastomeric preformed ethylene copolymer although, if desired, such monomeric substances as ortho- and para-methyl styrene, ortho-, meta-, and para-ethyl styrene, para-isopropyl styrene, monochloro styrene, the several dichloro styrenes, vinyl naphthalene, alpha-methyl styrene, and the like or mixtures thereof may be employed. Advantageously, the alkenyl aromatic monomer utilized in the practice of the present invention is one which may be represented by the structural formula:

in which G is selected from the group consisting of hydrogen and methyl and Ar is an aromatic radical of from 6 to about 10 carbon atoms (including the carbon atoms in ring-substituted alkyl substituents).

As indicated, one or a mixture of alkenyl aromatic monomers may be employed for preparation of graft copolymer compositions of the present invention or, with great advantage in many instances, one or more alkenyl aromatic monomers may be interpolymerized in a mixture with one or more acrylic monomers in the presence of the preformed ethylene copolymer substrate that is utilized. Thus, for example, mixtures of styrene and acrylonitrile or of styrene and one or more other alkenyl aromatic monomers with acrylonitrile and/or one or more other acrylic monomers may be employed with great advantage for preparation of the desired polymer products. In the cases when a mixture of one or more acrylic monomers with one or more alkenyl aromatic monomers is employed for preparation of the graft copolymers, it is advantageous for less than about 50 mole percent (generally, between about 0.5 to 50 mole percent) of the monomer mixture, based on the total composition thereof, to be comprised of the acrylic monomer. In many cases, it is desirable for the quality of the acrylic monomer, particularly acrylonitrile, that is employed in a mixture with one or more alkenyl aromatic monomers to comprise between about 35 and 45 mole percent of the interpolymerizable monomeric mixtures which is graft copolymerized on the preformed ethylene copolymer substrate. Although acrylonitrile (or vinyl cyanide as it is sometimes called) may be utilized with great advantage in the cases when it is desired to mix an alkenyl aromatic monomer with an acrylic monomer, such other acrylic monomers as acrylic acid, methacrylic acid, methyl methacrylate, ethyl acrylate, ethyl methacrylate, and the indicated amide derivatives may also be employed. The acrylic monomers which may be utilized with advantage in the practice of the present invention may be generically represented by the formula:

(IV)

in which R is selected from the group consisting of hydrogen and methyl and Q is nitrile (or cyanide, i.e., —C≡N), carboxyl (—COOH) and the methyl and ethyl esters thereof (—COOCH$_3$ and —COOC$_2$H$_5$, respectively), and the amido group (—CONH$_2$).

As is apparent, the preformed, elastomeric ethylene copolymers employed as the trunk or backbone substrates for the graft copolymer compositions of the present invention may be prepared, if desired, with mixtures of various comonomeric higher non-aromatic hydrocarbon monoolefins as well as with mixtures of various vinyl esters or vinyl ethers or with preformed copolymers prepared from ethylene copolymerized with mixed vinyl ester and vinyl ether comonomers. Likewise, mixtures of various preformed ethylene copolymer substrates may be utilized in the preparation of the graft copolymer compositions of the present invention using only a single alkenyl aromatic monomer for the interpolymerizable thereon, or mixtures thereof with one another or with one or more acrylic monomers.

The backbone substrate, preformed, elastomeric ethylene copolymers employed in the practice of the invention may often be obtained, as is herein manifest, by copolymerizing ethylene with the desired comonomer, which may be gaseous or liquid, under extremely high pressures in the neighborhood of 5,000 to 25,000 pounds per square inch or more using suitable catalyst, such as peroxide catalyst, for the copolymerization and heat at elevated temperatures in the neighborhood of 100–150° C. or so to accomplish the reaction. Of course, other suitable techniques as will be manifest to those skilled in the art, are also available for preparation of various species of the copolymers. Thus, certain suitable elastomeric ethylene copolymers, particularly those comprised of ethylene and other higher olefins such as propylene, may also be prepared with great advantage under atmospheric or relatively low pressures using Ziegler-type catalyst systems and following the general procedure outlined in Belgian Patent No. 533,362. Equivalent catalyst systems for the preparation of olefin polymers and copolymers under low pressures may also be utilized.

In order to illustrate the invention, the following examples are given, wherein all parts and percentages (unless otherwise indicated) are to be taken on a weight basis.

EXAMPLE 1

Into a pressure resistant autoclave having a capacity of about one liter there was charged a mixture of about 120 grams of the divinyl ether of diethylene glycol, about 240 grams of benzene as a solvent and about 0.387 gram of tertiary butyl hydroperoxide as a catalyst. The monomeric divinyl ether of diethylene glycol that was employed was a colorless liquid which boiled under atmospheric pressure at 195–197° C. and had a refractive index ($n_D^{35}$) of 1.4402 and a density at 25° C. of about 0.964 gram per cubic centimeter. The charged mixture was heated in the autoclave to a temperature of about 120° C., after which ethylene gas was introduced into the autoclave and maintained therein at a pressure of about 15,000 pounds per square inch (p.s.i.) over a period of about 20 hours while maintaining the contents at the indicated elevated temperature. At the termination of this period, the reaction mass was cooled and the autoclave vented. The copolymeric reaction product was removed from the autoclave by dissolving it in benzene from which it was recovered by pouring the benzene solution into methyl alcohol, whereupon the copolymer precipitated. The precipitated copolymer was then separated from the solvent mixture and then dried. There was in this way obtained about 115 grams of a copolymeric product in the form of a light colored powder. The elastomeric ethylene copolymer contained about 27.2 percent of the polymerized divinyl ether of diethylene glycol and 72.8 percent of ethylene. A solution of the copolymer in toluene containing about 0.5 percent by weight of the copolymer product had an absolute viscosity at 25° C. of about 0.72 centipoise.

A mixture of about 5 parts of the above described copolymer of ethylene and the divinyl ether of diethylene glycol and 95 parts of monomeric styrene was interpolymerized by heating in a closed container at a temperature of 130° C. for 12 hours followed by an additional period of 4 hours of heating at 150° C. The container and its contents were cooled and the graft copolymer composition removed. The thereby obtained graft copolymer composition was crushed to granular form and subsequently heated at 190° C. under an absolute pressure of 10 mm. Hg for a period of about 2 hours in order to remove volatile residues therefrom. After the devolatilization, the graft copolymer composition was again cooled and recomminuted to a granular form. There was thus obtained about 99 parts of graft copolymeric product.

About 98.65 parts of this graft copolymeric product was compounded with about 0.85 part of n-butyl stearate as a lubricant and 0.5 part of 2,6-ditertiary butyl-4-methylphenol as a stabilizer. The compounding was accomplished by milling the composition for about 10 minutes on open steel rolls maintained at 160° C. After the compounding, the graft copolymer composition was again broken and granulated.

Portions of the compounded graft copolymer product were injection molded to form standard test bars of ⅛ inch by ⅛ inch cross-section having lengths of about 3½ inches. These test bars were then employed to determine the tensile strength and elongation values of the product employing procedures similar to those described in ASTM B638–49T. The impact strength of the composition was determined on unnotched specimens with an Izod pendulum using two ⅛ inch bars side by side. Other molded test bars were used to determine the heat distortion temperature of the graft copolymer product employing the procedure described by Heirholzer and Boyer in A.S.T.M. Bulletin No. 134 of May, 1934. Based upon the averages of several samples, the graft copolymer product had the following properties:

Table I.—Properties

| | |
|---|---|
| Tensile strength pounds per square inch | 5860 |
| Elongation percent | 13.5 |
| Unnotched impact strength inch-pounds | 3.1 |
| Heat distortion temperature ° C | 86 |

Useful shaped articles, such as receptacle boxes, kitchen utensils, and so forth are made of the graft copolymer product by fabricating it in any desired and conventional manner, as by injection or compression molding it into desired forms.

EXAMPLE 2

In a series of four experiments, the preformed, elastomeric olefin copolymer of Example 1 was dissolved in varying proportions of monomeric vinyl toluene and the mixture heated in a closed container at 130° C. for an initial period of 12 hours followed by additional heating at 150° C. for 4 more hours in order to graft copolymerize the monomer on the preformed ethylene copolymer. Each of the graft copolymer products was recovered, compounded, molded and tested following procedures analogous to those employed in the first example. The composition of each of the graft copolymer products and their properties are set forth in the following tabulation.

Table II.—Properties

| | | | | |
|---|---|---|---|---|
| Percent vinyl toluene in graft copolymer composition | 80 | 85 | 90 | 95 |
| Percent elastomeric preformed ethylene copolymer in graft copolymer composition | 20 | 15 | 10 | 5 |
| Tensile strength, pounds per square inch | 2,760 | 3,450 | 4,030 | 5,190 |
| Elongation, percent | 9.8 | 13.0 | 13.3 | 12.3 |
| Unnotched impact strength, inch-pounds | 2.4 | 2.8 | 1.3 | 2.0 |
| Heat distortion temperature, ° C | 73 | 74 | 76 | 76 |

EXAMPLE 3

A preformed, elastomeric terpolymer of about 74±2 percent of ethylene, 13±6 percent of the monovinyl ether of diethylene glycol and 13±6 percent of the divinyl ether of diethylene glycol was prepared by copolymerizing ethylene with the mono- and divinyl ethers of diethylene glycol following the procedure employed in the first example. As in the first example, the preformed terpolymer was then dissolved in monomeric styrene to obtain a solution containing about 5 percent solution of the terpolymer in the styrene, based on the weight of the resulting solution. The solution was polymerized by heating it in a closed container at 130° C. for about 12 hours followed by an additional period of heating for 4 hours at 150° C. The graft copolymeric product was recovered and devolatilized employing a procedure analogous to that set forth in the first example. Thereafter, the graft copolymeric product was heat plastified on compounding rolls and subsequently milled at temperatures between about 150 and 160° C. for a period of 6 minutes while incorporating about 0.5 percent of 2,6-ditertiary-butyl-4-methyl phenol as a stabilizer and 0.85 percent of n-butyl stearate as a plasticizer therein. After being removed from the rolls, the resulting compounded graft copolymer product was allowed to cool before being comminuted. Molded test bars of the composition were prepared and tested by the procedure set forth in the first example. The graft copolymer product had the following properties:

Table III.—Properties

| | |
|---|---|
| Tensile strength pounds per square inch | 6130 |
| Elongation percent | 9.8 |
| Unnotched impact strength inch-pounds | 3.0 |
| Heat distortion temperature ° C | 84 |

In addition, several test bars of the compounded composition were tested after being aged by exposure to ultraviolet light in an Atlas Fadeometer for 100 hours. After this period of exposure, the composition had a tensile strength of 6250 pounds per square inch; an elongation of 11.7 percent; and an unnotched impact strength of 2.1 inch-pounds. As is apparent, the graft copolymer composition had excellent aging characteristics.

EXAMPLE 4

In each of two experiments, about 10 grams of a copolymer of about 79.4 percent of ethylene and 20.6 percent of the monovinyl ether of diethylene glycol was dissolved in 90 grams of a different alkenyl aromatic monomer. In the first experiment, monomeric styrene was employed for dissolving the copolymer. In the second, monomeric vinyl toluene was utilized. The preformed elastomeric copolymer was prepared by a procedure similar to that described in Example 1. Its viscosity in a 0.5 percent solution in toluene at 90° C. was 0.31 centipoise. Each of the graft copolymer compositions was polymerized by heating the dissolved mixtures of the preformed copolymer in the monomer in a closed container at a temperature of 130° C. for an initial 12 hour period followed by heating at 150° C. for an additional 4 hours. The polymer products were recovered, devolatilized, molded and tested, employing procedures similar to those set forth in the first example. Each of the products had properties as set forth in the following tabulation:

Table IV.—Properties

| | Graft Copolymer of 90 Percent Styrene and 10 Percent Preformed Ethylene Polymer | Graft Copolymer of 90 Percent Vinyl Toluene and 10 Percent Preformed Ethylene Polymer |
|---|---|---|
| Tensile strength, pounds per square inch | 3,820 | 4,110 |
| Elongation, percent | 23.0 | 18.9 |
| Unnotched impact strength, inch-pounds | 1.6 | 1.4 |
| Heat distortion temperature, ° C | 80 | 70 |

EXAMPLE 5

An elastomeric copolymer of about 23.9 percent vinyl acetate and 76.1 percent ethylene was prepared by a procedure similar to that set forth in Example 1. The preformed copolymer had a viscosity at 25° C. of about 0.74 centipoise taken with a 0.5 percent solution of the copolymer in toluene. The ethylene copolymer was dissolved in monomeric vinyl toluene to form a 5 percent solution of the copolymer in the monomer. After polymerization, devolatilization, compounding, molding and testing as in the first example, the graft copolymer product was found to have the following properties:

Table V.—Properties

| | |
|---|---|
| Tensile strength pounds per square inch | 5640 |
| Elongation percent | 11.5 |
| Impact strength do | 1.5 |
| Heat distortion temperature ° C | 76 |

EXAMPLE 6

A preformed elastomeric terpolymer of ethylene, vinyl acetate and the divinyl ether of diethylene glycol was prepared by the procedure of the first example using about 100 grams of the divinyl ether of diethylene glycol; 200 grams of vinyl acetate; 550 grams of benzene as a solvent; and 0.768 gram of tertiary butyl hydroperoxide as a catalyst. The preformed terpolymer had a solution viscosity of about 0.82 centipoise at 25° C. in a 0.5 percent solution in toluene. The vinyl acetate content of the terpolymer, by oxygen analysis, was about 28.9 percent. The content of the polymerized divinyl ether of diethylene glycol was about 2–4 percent, as determined within the approximate limits of detection by infrared analysis.

The partially crystalline elastomeric terpolymer thereby obtained could be cured by the application of heat to a tough and insoluble rubber-like mass, indicating the presence of units of the divinyl ether of diethylene glycol in the polymer. Solutions of the uncooled preformed ethylene terpolymer of 5 and 10 percent, respectively, in monomeric styrene were prepared and polymerized at 130° C. for 16 hours followed by additional polymerization at 150° C. for 6 hours. Another sample of 5 percent of the terpolymer in styrene was polymerized at 70° C. for 147 hours. The resulting products were devolatilized, compounded, molded and tested, following the procedure set forth in the first example. The results are set forth in the subsequent tabulation:

*Table VI.—Preparation Data and Properties*

| | | | |
|---|---|---|---|
| Percent of ethylene terpolymer in graft copolymer composition | 5 | 10 | 5 |
| Polymerization temperature of graft copolymer | 130–150 | 130–150 | 70 |
| Tensile strength, pounds per square inch | 6,840 | 5,940 | 6,510 |
| Elongation, percent | 11.3 | 16.8 | 15.7 |
| Impact strength, inch-pounds | 1.8 | 2.4 | 3.2 |
| Heat distortion temperature, ° C | 88 | 90 | 86 |

Test specimens of the samples polymerized at 130–150° C. were exposed for 100 and 200 hour periods, respectively, to intense ultraviolet light in an Atlas Fadeometer to determine the effect of such exposure on the mechanical properties of the graft copolymer compositions. Th results are set forth in the following tabulation:

*Table VII.—Properties Upon Ultraviolet Light Exposure*

| | | | |
|---|---|---|---|
| Percent ethylene terpolymer in graft copolymer composition | 5 | 5 | 10 |
| Hours in Fadeometer | 100 | 200 | 100 |
| Tensile strength, pounds per square inch | 7,160 | 7,220 | 6,350 |
| Elongation, percent | 12.3 | 10.7 | 18.1 |
| Impact strength, inch-pounds | 1.7 | 1.8 | 1.8 |

EXAMPLE 7

A performed, elastomeric, semi-crystalline terpolymer melting at 63–71° C. was obtained following the general procedure of the first example by employing about 60 grams of benzene as a solvent, 20 grams of the divinyl ether of diethylene glycol, 20 grams of vinyl acetate and 0.120 gram of tertiary butyl hydroperoxide as the mass that was charged to the autoclave for the reaction with ethylene under the elevated pressure. The resulting terpolymer was found by analysis to contain about 77.69 percent carbon; 12.76 percent hydrogen and 9.56 percent oxygen (by difference). Upon infrared analysis, the presence of both vinyl ether and acetate groups was verified. The terpolymer contained about 71±3 percent of polymerized ethylene; 13±6 percent of polymerized vinyl acetate; and 16±7 percent of the polymerized divinyl ether of diethylene glycol. The viscosity of a 0.5 percent solution of the terpolymer in toluene at 25° C. was about 0.70 centipoise.

A 10 percent solution of the elastomeric terpolymer in vinyl toluene was prepared and polymerized at 130° C. for 12 hours and 150° C. for 4 hours. After devolatilization, compounding with 0.85 percent, n-butyl stearate and 0.5 percent stabilizer, molding and testing as in the first example, the graft copolymer product had the following properties:

*Table VIII.—Properties*

Tensile strength _____ pounds per square inch__ 4800
Elongation _____ percent__ 18.9
Impact strength _____ inch-pounds__ 3.2
Heat distortion temperature _____ ° C__ 71

EXAMPLE 8

About 5 parts of a homogeneous copolymer of ethylene and propylene containing about 35 mole percent of propylene in the copolymer molecule was mixed with about 95 parts of monomeric styrene in a steam heated sigma blade mixer. The rubbery, elastomeric ethylene/propylene copolymer dissolved in the styrene monomer within about 30 minutes with continued mixing. The mixing was maintained for about an additional 3½ hours until part of the monomeric styrene had become polymerized and the resulting mixture was quite viscous and opaque. The partially polymerized mass was then transferred to a bottle, wherein it was enclosed and heated for an initial period at 125° C. for 19 hours and subsequently at 150° C. for an additional 46 hours to complete the polymerization. The resulting graft copolymerized product was ground and compounded on steel rolls with one percent of butyl stearate incorporated therein as an internal lubricant. The cmpounding was accomplished at 160° C. for 10 minutes. After regrinding, the resulting graft copolymerized composition was injection molded into test specimens and tested in a manner similar to that set forth in the preceding examples. The graft copolymer-containing product had a tensile strength of about 5750 pounds per square inch; an elongation of about 20.5 percent; an unnotched impact strength of about 2.5 inch-pounds; and a heat distortion temperature of about 72° C.

EXAMPLE 9

A series of three elastomeric ethylene/propylene copolymer substrates was prepared under about atmospheric pressure using a suspended catalyst system made by premixing titanium tetrachloride with aluminum triisobutyl. Each of the copolymers was made by introducing a mixture in the desired proportion of the non-aromatic hydrocarbon olefin feed gases into a stirred reactor containing, as a solvent, a three liter total mixture of equal volumes of pentane and hexane. Each of the elastomeric copolymer products was maintained at constant composition by venting appropriate quantities of the feed stream in order to accomplish the desired result.

In the following tabulation there is set forth the data involved in the preparation of each of the ethylene/propylene copolymers prepared as well as the essential physical and chemical characteristics of each of the copolymer products.

*Table IX.—Elastomeric Ethylene/Propylene Copolymers*

| Copolymer | "A" | "B" | "C" |
|---|---|---|---|
| Mole ratio of ethylene to propylene in olefin gas feed | 4:1 | 9:1 | 1:1 |
| Mole ratio of aluminum to titanium in catalyst admixture | 1.8:1 | 2.25:1 | 2.2:1 |
| Concentration of $TiCl_4$ used in catalyst admixture, millimoles per liter of solvent | 28.5 | 3 | 30 |
| Reaction temperature, ° C | 27–35 | 31 | 27–37 |
| Reaction time, hours | 12 | 2.75 | 5 |
| Yield of copolymer, grams | 276 | 126 | 256 |
| Viscosity of copolymer at 135° C. dissolved at concentration of 0.1 grams per 100 milliliters of decalin, centipoises | 0.253 | 0.504 | 0.068 |
| Crystallinity of copolymer, taken as polyethylene crystallinity by means of X-ray diffraction, percent | 10.6 | 24.6 | 2.3 |
| Weight percent of propylene in copolymer | 35 | 15.5 | 66.5 |

Following the general procedure of Example 8, a series of graft copolymer compositions was prepared using the above-described elastomeric ethylene/propylene copolymers as preformed ethylene copolymer substrates. All of the graft copolymer compositions with the exception of those designated as Samples X–4 and X–9 in the following tabulation were made in the indicated manner. Samples X–4 and X–9 were interpolymerized in the mixer starting at 130° C. and gradually raising the temperature to 150° C. over a 12-hour period. For purposes of comparison, similar compositions were attempted to be prepared using, as preformed substrates, quantities of homopolymeric ethylene, homopolymeric propylene and an ethylene/propylene copolymer without the scope of the invention. Thus, Sample X–5 was prepared while attempting to interpolymerize the styrene monomer on and with a portion of essentially linear, high density, macromolecular polyethylene melting at about 135° C. prepared in accordance with the procedure described in the above-identified Belgian patent. Samples X-6 and X-9 were prepared with polyethylene of the conventional "polythene"-type branch structured variety obtained by polymerizing ethylene gas in the presence of polymerization-favoring quantities of oxygen under pressure in excess of 1000 atmospheres at a temperature between about 150 and 275° C. Sample X-7 was prepared with an ethylene/propylene copolymer substrate having a copolymerized propylene content of about 78 weight percent. Sample X-8 was homopolymeric propylene of the macromolecular variety prepared in the Ziegler process according to the disclosure of the referred-to Belgian patent. In all instances, about 5 parts of the preformed polymer substrate were mixed with about 95 parts of the monomeric styrene in the preparation of the desired compositions.

The resulting products were compounded, molded and tested following the procedure set forth in the preceding examples. The results are set forth in the subsequent tabulation:

styrene with the styrene/butadiene rubber had a tensile strength of about 5540 pounds per square inch; an elongation of only about 14.3 percent; and an impact strength of only about 1.3 inch-pounds.

EXAMPLE 10

The procedures of the first nine examples are generally repeated excepting to replace the alkenyl aromatic monomers employed for the interpolymerizations with mixtures of styrene and acrylonitrile containing about 40 mole percent of the acrylonitrile, based on the constitution of the monomeric mixture. At least commensurate good results are obtained. Excellent results are also achieved by repeating the foregoing procedures with monomer mixtures of about 40 mole percent acrylonitrile and 60 mole percent vinyl toluene.

By way of still additional contrast, a series of samples of reinforced polystyrene not in accordance with the present invention was prepared by polymerizing monomeric styrene in the presence of preformed, grade (i.e., melt index) 0.7 "polythene"-type polyethylene. The polymerization and testing of each sample was done in general

*Table X.—Properties*

| Sample | Preformed Polymer Substrate | Tensile Strength, Pounds Per Square Inch | Elongation, Percent | Impact Strength, Inch-Pounds | Heat Distortion Temperature, ° C. |
|---|---|---|---|---|---|
| X-1 | Ethylene copolymer "B" | 5,750 | 20.5 | 2.5 | 72 |
| X-2 | Ethylene copolymer "A" | 6,310 | 25.7 | 1.5 | 84 |
| X-3 | Ethylene copolymer "C" | 6,140 | 24.2 | 1.1 | 87 |
| X-4 | Ethylene Copolymer "C" | 4,480 | 24.7 | 0.8 | 74 |
| X-5 | Essentially linear, high density polyethylene. | 6,770 | 2.2 | 1.4 | 77 |
| X-6 | "Polythene"-type polyethylene | 6,080 | 2.7 | 0.9 | 72 |
| X-7 | 78 percent ethylene/propylene copolymer. | 6,810 | 3.7 | 1.2 | 82 |
| X-8 | Macromolecular polypropylene | 6,255 | 2.3 | 0.8 | 84 |
| X-9 | "Polythene"-type polyethylene | 7,360 | 2.7 | 1.3 | 74 |

By way of contrast with the results set forth in the immediately foregoing and in the other preceding examples, conventional commercially available homopolystyrene has a tensile strength of from 6500 to 7500 pounds per square inch; an elongation of from 2 to 3 percent; an impact strength of from 0.9 to 1.6 inch-pounds; and a heat distortion temperature of from 80 to 84° C. A widely accepted, commercially available graft copolymer-containing composition of about 95 parts of styrene interpolymerized with about 5 parts of a preformed polymer substrate of an elastomeric and rubbery copolymer of about 30 percent of styrene and 70 percent butadiene was found to have a tensile strength of about 5200 pounds per square inch; an elongation of about 26 percent; an impact strength of about 4.3 inch-pounds; and a heat distortion temperature of about 72° C. After 50 hours of exposure to intense ultraviolet light in an Atlas Fadeometer, the same 95.5 graft copolymer composition of accordance with the above indicated procedure. The results are set forth in the following tabulation:

*Table XI.—Compositions With Preformed Polyethylene Substrates*

| Sample | Weight Percent "Polythene"-Type Polyethylene | Weight Percent Styrene Monomer | Tensile Strength, Pounds Per Square Inch | Elongation, Percent | Impact Strength, Inch-Pounds | Heat Distortion Temperature, ° C. |
|---|---|---|---|---|---|---|
| XI-1 | 2 | 98 | 8,770 | 5.6 | 1.6 | 87 |
| XI-2 | 5 | 95 | 7,510 | 3.6 | 1.1 | 83 |
| XI-3 | 10 | 90 | 7,150 | 2.6 | 0.9 | 86 |
| XI-4 | 20 | 80 | 5,050 | 2.1 | 0.8 | 86 |
| XI-5 | 30 | 70 | 4,170 | 1.9 | 0.9 | 74 |
| XI-6 | 40 | 60 | 3,910 | 2.0 | 1.2 | 74 |
| XI-7 | 5 | ¹ 93.5 | 7,750 | 4.1 | 0.9 | 80 |

¹ Also contained about 1.5 percent mineral oil in monomer.

In order to afford still further contrast and comparison with the results of the graft copolymer compositions of the present invention, a series of physical mixtures of polyethylene and polystyrene not in accordance with the present invention were prepared and tested in the manner set forth in the preceding examples. A grade or melt index 0.7 "polythene"-type, conventional branch-structured polyethylene (obtained from Imperial Chemical Industries) was employed in the compositions along with commercially available homopolystyrene ("Styron 666"), having properties as disclosed in the foregoing. The samples were milled on steel rolls at 160° for 10 minutes prior to being ground and injection molded. The results are set forth in the following tabulation, which also includes the average properties found in duplicate samples of the polystyrene and polyethylene used in the blends.

*Table XII.—Physical Mixtures of Polystyrene and Polyethylene*

| Sample | Weight Percent Polystyrene | Weight Percent Polyethylene | Tensile Strength, Pounds per Square Inch | Elongation, Percent | Impact Strength, Inch-Pounds | Heat Distortion Temperature, °C. |
|---|---|---|---|---|---|---|
| XII-1 | 100 | 0 | 7,250 | 3.1 | 1.3 | 79 |
| XII-2 | 100 | 0 | 7,650 | 3.8 | 0.9 | 83 |
| XII-3 | 90 | 10 | 6,540 | 3.6 | 0.9 | 81 |
| XII-4 | 75 | 25 | 4,640 | 2.8 | 1.0 | 76 |
| XII-5 | 50 | 50 | 3,080 | 2.5 | 1.7 | 72 |
| XII-6 | 25 | 75 | 2,020 | 9.1 | (1) | 63 |
| XII-7 | 0 | 100 | 2,760 | 35.8 | (1) | 40 |
| XII-8 | 0 | 100 | 2,640 | 34.0 | (1) | 42 |

[1] Value not determined due to sample bending over.

Results analogous to those demonstrated in the foregoing examples of the compositions in accordance with the present invention may be obtained when the graft copolymers are prepared with other alkenyl aromatic monomers indicated to be within the scope of the invention; or when other elastomeric ethylene copolymers prepared with other olefins or other vinyl ethers and esters or mixtures of ethers and esters within the scope of the invention are utilized; or when other mixtures of one or more alkenyl aromatic monomers of the Formula III are employed with one or more acrylic monomers of the Formula IV within the herein described purview of the present contribution to the art.

What is claimed is:

1. Graft copolymer-containing composition of (1) between about 80 and 99 weight percent, based on the weight of the composition, of the polymerization product of a monomer comprising an alkenyl aromatic monomer of the formula:

$$CH_2=CGAr$$

in which G is selected from the group consisting of hydrogen and methyl and Ar is an aromatic radical of from 6 to 10 carbon atoms, said monomer being inter-polymerized with (2) between about 1 and 20 weight percent, based on the weight of the composition, of an already-formed, elastomeric copolymer of ethylene and the divinyl ether of diethylene glycol.

2. Graft copolymer-containing composition of (1) between 80 and 99 weight percent, based on the weight of the composition, of the polymerization product of a monomer comprising an alkenyl aromatic monomer of the formula $$CH_2=CGAr$$

in which G is selected from the group consisting of hydrogen and methyl and Ar is an aromatic radical of from 6 to 10 carbon atoms, said monomer being interpolymerized with (2) between about 1 and 20 weight percent, based on the weight of the composition, of an already-formed elastomeric terpolymer of ethylene, the divinyl ether of diethylene glycol and vinyl acetate.

3. Graft copolymer-containing composition of (1) between about 80 and 99 weight percent, based on the weight of the composition of the polymerization product of a monomeric constituent consisting of a mixture of styrene and between about 35 and 45 mole percent of acrylonitrile, based on the constitution of said monomeric constituent, said monomeric constituent being interpolymerized with (2) between about 1 and 20 weight percent, based on the weight of the composition, of an already-formed, elastomeric ethylene copolymer substrate selected from the group of elastomeric ethylene copolymers consisting of (a) elastomeric copolymers of ethylene and between about 15 and 75 weight percent, based on the weight of the copolymer, of another non-aromatic hydrocarbon terminally-unsaturated monoolefin of from 3 to 6 carbon atoms; (b) elastomeric copolymers of ethylene and between about 2 and 40 mole percent, based on the weight of the copolymer, of a vinyl ester of the structure:

$$CH_2=CHOCX$$
$$\quad\quad\quad\|$$
$$\quad\quad\quad O$$

in which X is selected from the group consisting of hydrogen, alkyl groups of from 1 to 8 carbon atoms and aryl groups of from 6 to 8 carbon atoms; (c) elastomeric copolymers of ethylene and between about 2 and 40 weight percent, based on the weight of the copolymer, of a vinyl ether of the structure:

$$CH_2=CHOZ$$

wherein Z is selected from the group consisting of vinyl, alkyl groups of from 1 to 8 carbon atoms, aryl groups of from 6 to 8 carbon atoms, alkylene groups of from 2 to 8 carbon atoms, mono- and divalent hydrocarbon aliphatic groups of from 2 to 10 carbon atoms, and mono- and divalent ether-containing aliphatic groups of from 2 to 10 carbon atoms; (d) elastomeric copolymers of ethylene and between about 2 and 40 weight percent, based on the weight of the copolymer, of mixtures of said vinyl esters and said vinyl ethers.

4. The composition of claim 3, wherein said already-formed, elastomeric ethylene copolymer substrate is an elastomeric copolymer of ethylene and the divinyl ether of diethylene glycol.

5. The composition of claim 3 wherein said already-formed, elastomeric ethylene copolymer substrate is an elastomeric terpolymer of ethylene, vinyl acetate and the divinyl ether of diethylene glycol.

6. Composition comprising a member of the group consisting of (A) graft copolymer-containing composition of (1) between about 80 and 99 weight percent, based on the weight of the composition, of the polymerization product of a monomer comprising an alkenyl aromatic monomer of the formula:

$$CH_2=CGAr$$

in which G is selected from the group consisting of hydrogen and methyl and Ar is an aromatic radical of from 6 to 10 carbon atoms, said monomer being interpolymerized with (2) between about 1 and 20 weight percent, based on the weight of the composition, of an already-formed, elastomeric copolymer of ethylene and the divinyl ether of diethylene glycol; (B) graft copolymer-containing composition of (1) between 80 and 99 weight percent, based on the weight of the composition, of the polymerization product of a monomer comprising an alkenyl aromatic monomer of the formula $$CH_2=CGAr$$

in which G is selected from the group consisting of hydrogen and methyl and Ar is an aromatic radical of from 6 to 10 carbon atoms, said monomer being interpolymerized with (2) between about 1 and 20 weight percent, based on the weight of the composition, of an already-formed elastomeric terpolymer of ethylene, the divinyl ether of diethylene glycol and vinyl acetate; and (C) graft copolymer-containing composition of (1) between about 80 and 99 weight percent, based on the weight of the composition of the polymerization product of a monomeric constituent consisting of a mixture of styrene and between about 35 and 45 mole percent of acrylonitrile, based on the constitution of said monomeric constituent, said monomeric constituent being interpolymerized with (2) between about 1 and 20 weight percent, based on the weight of the composition, of an already-formed, elastomeric ethylene copolymer substrate selected from the group of elastomeric ethylene copolymers consisting of (a) elastomeric copolymers of ethylene and between about 15 and 75 weight percent, based on the weight of the copolymer, of another non-aromatic hydrocarbon terminally-unsaturated monoolefin of from 3 to 6 carbon atoms, (b) elastomeric copolymers of ethylene and between about 2 and 40 mole percent, based on the weight of the copolymer, of a vinyl ester of the structure:

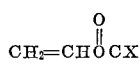

in which X is selected from the group consisting of hydrogen, alkyl groups of from 1 to 8 carbon atoms and aryl groups of from 6 to 8 carbon atoms; (c) elastomeric copolymers of ethylene and between about 2 and 40 weight percent, based on the weight of the copolymer, of a vinyl ether of the structure:

$$CH_2=CHOZ$$

wherein Z is selected from the group consisting of vinyl, alkyl groups of from 1 to 8 carbon atoms, aryl groups of from 6 to 8 carbon atoms, alkylene groups of from 2 to 8 carbon atoms, mono- and divalent hydrocarbon aliphatic groups of from 2 to 10 carbon atoms, and mono- and divalent ether-containing aliphatic groups of from 2 to 10 carbon atoms; (d) elastomeric copolymers of ethylene and between about 2 and 40 weight percent, based on the weight of the copolymer, of mixtures of said vinyl esters and said vinyl ethers.

References Cited in the file of this patent
UNITED STATES PATENTS

| | | |
|---|---|---|
| 2,485,796 | White | Oct. 25, 1949 |
| 2,741,650 | Lukman et al. | Apr. 10, 1956 |
| 2,834,746 | Salyer et al. | May 13, 1958 |
| 2,837,496 | Vandenberg | June 3, 1958 |
| 2,852,504 | Towne et al. | Sept. 16, 1958 |

FOREIGN PATENTS

| | | |
|---|---|---|
| 553,779 | Belgium | June 28, 1957 |